United States Patent
Malik

(10) Patent No.: US 11,195,206 B2
(45) Date of Patent: Dec. 7, 2021

(54) METHODS AND SYSTEMS FOR PROVIDING CONTEXTUAL INFORMATION

(71) Applicant: Facebook, Inc., Menlo Park, CA (US)

(72) Inventor: Dale W. Malik, Dunwoody, GA (US)

(73) Assignee: FACEBOOK, INC., Menlo Park, CA (US)

( * ) Notice: Subject to any disclaimer, the term of this patent is extended or adjusted under 35 U.S.C. 154(b) by 1162 days.

(21) Appl. No.: 14/328,509

(22) Filed: Jul. 10, 2014

(65) Prior Publication Data

US 2014/0324595 A1   Oct. 30, 2014

Related U.S. Application Data

(63) Continuation of application No. 14/323,969, filed on Jul. 3, 2014, now abandoned, which is a continuation
(Continued)

(51) Int. Cl.
  *G06Q 30/02*   (2012.01)
  *G06F 16/958*  (2019.01)
  (Continued)

(52) U.S. Cl.
  CPC ....... *G06Q 30/0257* (2013.01); *G06F 3/0482* (2013.01); *G06F 16/958* (2019.01);
  (Continued)

(58) Field of Classification Search
  USPC ...................................................... 705/14.1
  See application file for complete search history.

(56) References Cited

U.S. PATENT DOCUMENTS 4,266,098 A   5/1981   Novak
4,703,423 A   10/1987  Bado et al.
(Continued)

FOREIGN PATENT DOCUMENTS

JP   2000-105739   4/2000
WO   WO 97/17774   5/1997
WO   WO 03/056821  7/2003

OTHER PUBLICATIONS

U.S. Appl. No. 11/638,546, Mar. 22, 2016, Office Action.
(Continued)

*Primary Examiner* — Afaf Osman Bilal Ahmed
(74) *Attorney, Agent, or Firm* — Keller Jolley Preece

(57) ABSTRACT

Methods for providing contextual information about communication devices and/or services. Profile information indicating a user's communication devices and/or services is stored. When profile information or a message log is displayed, the user may identify a communication device and/or service. A query inquires whether the user would like contextual information. The contextual information may be obtained from a gateway in a data network or a telecommunications manager in a telecommunication network. The contextual information is displayed. Profile information about a user's communicating partner may be stored. When the user makes an effort to communicate with the partner, a check may be made of the partner's profile information for a preferred communication device and/or service. If the user does not have a communication device and/or service corresponding to that of the communicating partner, a query may inquire whether the user would like contextual information. If so, the contextual information is presented.

20 Claims, 8 Drawing Sheets

Related U.S. Application Data of application No. 10/184,670, filed on Jun. 28, 2002, now abandoned, which is a continuation-in-part of application No. 09/966,703, filed on Sep. 28, 2001, now Pat. No. 7,313,617.

(51) Int. Cl.

| | | |
|---|---|---|
| *G06Q 10/10* | (2012.01) | |
| *H04L 29/12* | (2006.01) | |
| *H04L 12/58* | (2006.01) | |
| *H04M 3/22* | (2006.01) | |
| *H04M 3/436* | (2006.01) | |
| *H04M 3/53* | (2006.01) | |
| *G06F 21/62* | (2013.01) | |
| *H04L 12/24* | (2006.01) | |
| *H04L 29/08* | (2006.01) | |
| *G06F 3/0482* | (2013.01) | |
| *H04L 29/06* | (2006.01) | |
| *H04M 3/42* | (2006.01) | |
| *H04M 3/537* | (2006.01) | |
| *H04M 7/00* | (2006.01) | |
| *H04M 7/12* | (2006.01) | |

(52) U.S. Cl.
CPC .......... *G06F 21/62* (2013.01); *G06Q 10/107* (2013.01); *G06Q 10/109* (2013.01); *G06Q 30/02* (2013.01); *G06Q 30/0267* (2013.01); *G06Q 30/0269* (2013.01); *H04L 29/12169* (2013.01); *H04L 41/22* (2013.01); *H04L 51/04* (2013.01); *H04L 51/24* (2013.01); *H04L 51/36* (2013.01); *H04L 61/1576* (2013.01); *H04L 65/403* (2013.01); *H04L 67/32* (2013.01); *H04M 3/2218* (2013.01); *H04M 3/436* (2013.01); *H04M 3/5307* (2013.01); *H04L 67/2804* (2013.01); *H04L 69/329* (2013.01); *H04M 3/4211* (2013.01); *H04M 3/42059* (2013.01); *H04M 3/537* (2013.01); *H04M 7/0036* (2013.01); *H04M 7/0045* (2013.01); *H04M 7/0054* (2013.01); *H04M 7/128* (2013.01); *H04M 7/1235* (2013.01); *H04M 2203/2066* (2013.01); *H04M 2242/22* (2013.01); *H04Q 2213/13175* (2013.01); *H04Q 2213/13338* (2013.01); *H04Q 2213/13377* (2013.01)

(56) References Cited

U.S. PATENT DOCUMENTS

| | | |
|---|---|---|
| 4,706,242 A | 11/1987 | Harland |
| 4,850,007 A | 7/1989 | Marino et al. |
| 4,935,954 A | 6/1990 | Thompson et al. |
| 4,969,136 A | 11/1990 | Chamberlin et al. |
| 4,975,896 A | 12/1990 | D'Agosto et al. |
| 5,311,583 A | 5/1994 | Friedes et al. |
| 5,404,505 A | 4/1995 | Levinson |
| 5,436,965 A | 7/1995 | Grossman et al. |
| 5,570,417 A | 10/1996 | Byers |
| 5,592,470 A | 1/1997 | Rudrapatna et al. |
| 5,604,492 A | 2/1997 | Abdul-Halim |
| 5,608,786 A | 3/1997 | Gordon |
| 5,621,790 A | 4/1997 | Grossman et al. |
| 5,644,624 A | 7/1997 | Caldwell |
| 5,661,783 A | 8/1997 | Assis |
| 5,703,571 A | 12/1997 | Cannon et al. |
| 5,708,775 A | 1/1998 | Nakamura |
| 5,802,510 A | 9/1998 | Jones |
| 5,812,654 A | 9/1998 | Anderson et al. |
| 5,818,438 A | 10/1998 | Howe et al. |
| 5,818,447 A | 10/1998 | Wolf et al. |
| 5,822,410 A | 10/1998 | McCausland et al. |
| 5,852,775 A | 12/1998 | Hidary |
| 5,872,841 A | 2/1999 | King et al. |
| 5,889,799 A | 3/1999 | Grossman et al. |
| 5,892,508 A | 4/1999 | Howe et al. |
| 5,909,589 A | 6/1999 | Parker et al. |
| 5,937,047 A | 8/1999 | Stabler |
| 5,943,417 A | 8/1999 | Cox et al. |
| 5,946,386 A | 8/1999 | Rogers |
| 5,966,437 A | 10/1999 | Cox et al. |
| 5,974,388 A | 10/1999 | Durham |
| 5,978,475 A | 11/1999 | Schneier et al. |
| 5,987,100 A | 11/1999 | Fortman et al. |
| 6,002,394 A | 12/1999 | Schein et al. |
| 6,014,135 A | 1/2000 | Fernandes |
| 6,023,700 A | 2/2000 | Owens et al. |
| 6,052,730 A | 4/2000 | Felciano et al. |
| 6,055,512 A | 4/2000 | Dean et al. |
| 6,065,047 A | 5/2000 | Carpenter et al. |
| 6,075,850 A | 6/2000 | Ali et al. |
| 6,084,628 A | 7/2000 | Sawyer |
| 6,088,588 A | 7/2000 | Osborne |
| 6,091,802 A | 7/2000 | Smith et al. |
| 6,097,942 A | 8/2000 | Laiho |
| 6,118,856 A | 9/2000 | Paarsmark et al. |
| 6,125,108 A | 9/2000 | Shaffer et al. |
| 6,128,624 A | 10/2000 | Papeirniak et al. |
| 6,133,853 A | 10/2000 | Obradovich et al. |
| 6,134,235 A | 10/2000 | Goldman et al. |
| 6,144,644 A | 11/2000 | Bajzath et al. |
| 6,147,975 A | 11/2000 | Bowman-Amuah |
| 6,148,261 A | 11/2000 | Obradovich et al. |
| 6,148,329 A | 11/2000 | Meyer |
| 6,151,584 A | 11/2000 | Papeirniak et al. |
| 6,154,530 A | 11/2000 | Letellier |
| 6,157,709 A | 12/2000 | Lawser et al. |
| 6,167,119 A | 12/2000 | Bartholomew et al. |
| 6,182,142 B1 | 1/2001 | Win et al. |
| 6,185,433 B1 | 2/2001 | Lele et al. |
| 6,205,211 B1 | 3/2001 | Thomas et al. |
| 6,208,721 B1 | 3/2001 | Feinberg et al. |
| 6,216,104 B1 | 4/2001 | Moshfeghi et al. |
| 6,233,317 B1 | 5/2001 | Homan et al. |
| 6,236,768 B1 | 5/2001 | Rhodes |
| 6,237,027 B1 | 5/2001 | Namekawa |
| 6,247,043 B1 | 6/2001 | Bates et al. |
| 6,252,672 B1 | 6/2001 | Sugawara et al. |
| 6,253,188 B1 | 6/2001 | Witek et al. |
| 6,266,690 B1 | 7/2001 | Shankarappa et al. |
| 6,272,150 B1 | 8/2001 | Hrastar et al. |
| 6,272,537 B1 | 8/2001 | Kekic et al. |
| 6,282,275 B1 | 8/2001 | Gurbani |
| 6,301,245 B1 | 10/2001 | Luzeski et al. |
| 6,301,342 B1 | 10/2001 | Ander et al. |
| 6,304,635 B1 | 10/2001 | Iwani et al. |
| 6,308,328 B1 | 10/2001 | Bowcutt et al. |
| 6,317,485 B1 | 11/2001 | Homan et al. |
| 6,320,947 B1 | 11/2001 | Joyce et al. |
| 6,330,079 B1 | 12/2001 | Dugan et al. |
| 6,338,066 B1 | 1/2002 | Martin et al. |
| 6,339,639 B1 | 1/2002 | Henderson |
| 6,345,239 B1 | 2/2002 | Bowman-Amuah |
| 6,351,771 B1 | 2/2002 | Craddock et al. |
| 6,353,659 B1 | 3/2002 | VanRyzin et al. |
| 6,353,852 B1 | 3/2002 | Nestoriak et al. |
| 6,360,254 B1 | 3/2002 | Linden et al. |
| 6,385,311 B1 * | 5/2002 | Bauer ............... H04M 3/42144 379/201.02 |
| 6,400,810 B1 | 6/2002 | Skladman et al. |
| 6,404,762 B1 | 6/2002 | Luzeski et al. |
| 6,411,685 B1 | 6/2002 | O'Neal |
| 6,421,725 B1 | 7/2002 | Vermilyea et al. |
| 6,424,966 B1 | 7/2002 | Meyerzon et al. |
| 6,424,995 B1 | 7/2002 | Shuman |
| 6,430,177 B1 | 8/2002 | Luzeski et al. |
| 6,430,188 B1 | 8/2002 | Kadambi et al. |
| 6,434,747 B1 | 8/2002 | Khoo et al. |
| 6,445,682 B1 | 9/2002 | Weitz |
| 6,445,913 B1 | 9/2002 | Ezuriko |

(56) References Cited

U.S. PATENT DOCUMENTS

| | | |
|---|---|---|
| 6,453,353 B1 | 9/2002 | Win et al. |
| 6,459,782 B1 | 10/2002 | Bedrosian |
| 6,460,082 B1 | 10/2002 | Lumelsky et al. |
| 6,493,437 B1 | 12/2002 | Olshansky |
| 6,496,838 B1 | 12/2002 | Zamora-Mckelvy et al. |
| 6,502,242 B1 | 12/2002 | Howe et al. |
| 6,515,968 B1 | 2/2003 | Combar et al. |
| 6,518,984 B1 | 2/2003 | Maeckel et al. |
| 6,526,044 B1 | 2/2003 | Cookmeyer et al. |
| 6,529,954 B1 | 3/2003 | Cookmeyer et al. |
| 6,535,585 B1 | 3/2003 | Hanson et al. |
| 6,556,666 B1 | 4/2003 | Beyda et al. |
| 6,560,633 B1 | 5/2003 | Roberts |
| 6,564,261 B1 | 5/2003 | Gudjonsson et al. |
| 6,567,982 B1 | 5/2003 | Howe et al. |
| 6,570,855 B1 | 5/2003 | Kung et al. |
| 6,574,678 B1 | 6/2003 | Nykaned et al. |
| 6,594,255 B1 | 7/2003 | Neuman |
| 6,608,637 B1 | 8/2003 | Beaton et al. |
| 6,609,253 B1 | 8/2003 | Swix et al. |
| 6,611,501 B1 | 8/2003 | Owen et al. |
| 6,615,184 B1 | 9/2003 | Hicks |
| 6,615,241 B1 | 9/2003 | Miller et al. |
| 6,625,258 B1 * | 9/2003 | Ram .................. H04L 12/5835 379/373.01 |
| 6,631,186 B1 | 10/2003 | Adams et al. |
| 6,631,402 B1 | 10/2003 | Devine |
| 6,633,630 B1 | 10/2003 | Owens et al. |
| 6,640,230 B1 | 10/2003 | Alexander et al. |
| 6,640,241 B1 | 10/2003 | Ozzie et al. |
| 6,665,378 B1 | 12/2003 | Spielman et al. |
| 6,699,007 B2 | 3/2004 | Huang et al. |
| 6,701,348 B2 | 3/2004 | Sommerer |
| 6,708,202 B1 | 3/2004 | Shuman et al. |
| 6,711,154 B1 | 3/2004 | O'Neal |
| 6,717,513 B1 | 4/2004 | Sandelman et al. |
| 6,721,748 B1 | 4/2004 | Knight et al. |
| 6,731,927 B1 | 5/2004 | Stern et al. |
| 6,735,286 B1 | 5/2004 | Hansen et al. |
| 6,738,462 B1 | 5/2004 | Brunson |
| 6,741,697 B2 | 5/2004 | Benson et al. |
| 6,745,229 B1 | 6/2004 | Gobin et al. |
| 6,747,970 B1 | 6/2004 | Lamb et al. |
| 6,748,056 B1 | 6/2004 | Capriotti et al. |
| 6,754,181 B1 | 6/2004 | Elliott et al. |
| 6,757,732 B1 | 6/2004 | Sollee et al. |
| 6,760,601 B1 | 7/2004 | Suoknunti |
| 6,760,727 B1 | 7/2004 | Schroeder et al. |
| 6,763,102 B1 | 7/2004 | Chen |
| 6,766,369 B1 | 7/2004 | Haitsuka et al. |
| 6,768,722 B1 | 7/2004 | Katseff et al. |
| 6,772,188 B1 | 8/2004 | Cloutier |
| 6,782,086 B2 | 8/2004 | Clapper |
| 6,785,266 B2 | 8/2004 | Swartz |
| 6,785,379 B1 | 8/2004 | Rogers |
| 6,788,926 B1 | 9/2004 | Frangione et al. |
| 6,798,868 B1 | 9/2004 | Montgomery et al. |
| 6,804,707 B1 | 10/2004 | Ronning |
| 6,804,716 B1 | 10/2004 | Koch et al. |
| 6,806,977 B1 | 10/2004 | Freeny et al. |
| 6,807,423 B1 | 10/2004 | Armstrong et al. |
| 6,807,574 B1 | 10/2004 | Partovi et al. |
| 6,816,469 B1 | 11/2004 | Kung et al. |
| 6,820,204 B1 | 11/2004 | Desai et al. |
| 6,826,639 B2 | 11/2004 | Pasumansky |
| 6,829,233 B1 | 12/2004 | Gilboy |
| 6,834,195 B2 | 12/2004 | Brandenberg et al. |
| 6,839,414 B1 | 1/2005 | Enzmann et al. |
| 6,842,767 B1 | 1/2005 | Partovi et al. |
| 6,853,711 B2 | 2/2005 | Brisebois et al. |
| 6,857,024 B1 | 2/2005 | Chen |
| 6,879,995 B1 | 4/2005 | Chinta et al. |
| 6,882,709 B1 | 4/2005 | Sherlock |
| 6,892,083 B2 | 5/2005 | Shostak |
| 6,895,426 B1 | 5/2005 | Cotright et al. |
| 6,895,559 B2 | 5/2005 | Forder |
| 6,904,137 B2 | 6/2005 | Brandt et al. |
| 6,910,186 B2 | 6/2005 | Kim |
| 6,914,967 B1 | 7/2005 | Baca et al. |
| 6,917,610 B1 | 7/2005 | Kung |
| 6,920,208 B1 | 7/2005 | Rosen |
| 6,920,213 B2 | 7/2005 | Pershan |
| 6,928,154 B1 | 8/2005 | Cheaito |
| 6,940,958 B2 | 9/2005 | Clapper |
| 6,947,979 B1 | 9/2005 | Pon |
| 6,948,838 B2 | 9/2005 | Ruthfield et al. |
| 6,961,751 B1 | 11/2005 | Bates et al. |
| 6,973,556 B2 | 12/2005 | Milligan et al. |
| 6,980,982 B1 | 12/2005 | Geddes et al. |
| 6,981,023 B1 | 12/2005 | Hamilton et al. |
| 6,981,040 B1 | 12/2005 | Konig et al. |
| 6,981,223 B2 | 12/2005 | Becker |
| 6,988,128 B1 | 1/2006 | Alexander et al. |
| 7,007,085 B1 | 2/2006 | Malik |
| 7,031,961 B2 | 4/2006 | Pitkow et al. |
| 7,062,535 B1 | 6/2006 | Stark |
| 7,088,805 B1 | 8/2006 | Moore |
| 7,092,936 B1 | 8/2006 | Alonso et al. |
| 7,096,232 B2 | 8/2006 | Doss |
| 7,107,275 B2 | 9/2006 | Quinn et al. |
| 7,117,504 B2 | 10/2006 | Smith et al. |
| 7,130,891 B2 | 10/2006 | Bernardin et al. |
| 7,171,448 B1 | 1/2007 | Danielson et al. |
| 7,213,005 B2 | 5/2007 | Mourad et al. |
| 7,225,409 B1 * | 5/2007 | Schnarel ............. H04M 1/2478 715/747 |
| 7,272,633 B2 | 9/2007 | Malik |
| 7,313,617 B2 | 12/2007 | Malik |
| 7,325,032 B2 | 1/2008 | Zuberec et al. |
| 7,441,027 B2 | 10/2008 | Malik |
| 7,472,187 B2 | 12/2008 | Malik |
| 7,496,189 B2 | 2/2009 | Clarisse et al. |
| 7,525,955 B2 | 4/2009 | Velez-Rivera et al. |
| 7,778,399 B2 | 8/2010 | Ambrose |
| 7,860,804 B2 | 12/2010 | Littrell |
| 7,929,951 B2 | 4/2011 | Stevens |
| 8,023,622 B2 | 9/2011 | Timmins et al. |
| 8,271,591 B2 | 9/2012 | Malik |
| 8,341,018 B2 | 12/2012 | Malik |
| 8,423,412 B2 | 4/2013 | Vierl |
| 8,554,693 B2 | 10/2013 | Littrell |
| 8,554,718 B2 | 10/2013 | Gage |
| 8,560,673 B2 | 10/2013 | Malik |
| 2001/0013050 A1 | 8/2001 | Shah |
| 2001/0013069 A1 | 8/2001 | Shah |
| 2001/0027478 A1 | 10/2001 | Meier |
| 2001/0029468 A1 | 10/2001 | Yamaguchi |
| 2002/0029163 A1 | 3/2002 | Joao |
| 2002/0055924 A1 | 5/2002 | Liming |
| 2002/0059117 A1 | 5/2002 | Yoch et al. |
| 2002/0069048 A1 | 6/2002 | Sadhwani et al. |
| 2002/0073142 A1 | 6/2002 | Moran |
| 2002/0076015 A1 | 6/2002 | Norwitz et al. |
| 2002/0078151 A1 | 6/2002 | Wickam et al. |
| 2002/0091829 A1 | 7/2002 | Wood |
| 2002/0092021 A1 | 7/2002 | Yap et al. |
| 2002/0098849 A1 | 7/2002 | Bloebaum et al. |
| 2002/0099657 A1 | 7/2002 | Black et al. |
| 2002/0099775 A1 | 7/2002 | Gupta et al. |
| 2002/0099777 A1 | 7/2002 | Gupta et al. |
| 2002/0111813 A1 | 8/2002 | Capps |
| 2002/0124057 A1 | 9/2002 | Besprosvan |
| 2002/0174188 A1 | 11/2002 | Clark et al. |
| 2002/0180776 A1 | 12/2002 | Fishman |
| 2002/0184329 A1 | 12/2002 | Chen et al. |
| 2002/0194274 A1 | 12/2002 | Kroeger |
| 2003/0009530 A1 | 1/2003 | Philonenko et al. |
| 2003/0014553 A1 | 1/2003 | Zhao |
| 2003/0023757 A1 | 1/2003 | Ishioka et al. |
| 2003/0065778 A1 | 4/2003 | Malik |
| 2003/0087652 A1 | 5/2003 | Simon |
| 2003/0156134 A1 | 8/2003 | Kim |
| 2004/0091091 A1 | 5/2004 | Maruyama |
| 2004/0125133 A1 | 7/2004 | Pea et al. |

(56) References Cited

U.S. PATENT DOCUMENTS

| | | |
|---|---|---|
| 2004/0236619 A1 | 11/2004 | Gundersen et al. |
| 2004/0254999 A1 | 12/2004 | Bulleit et al. |
| 2005/0038863 A1 | 2/2005 | Onyon et al. |
| 2005/0120305 A1 | 6/2005 | Engstrom et al. |
| 2005/0149487 A1 | 7/2005 | Celik |
| 2005/0188043 A1 | 8/2005 | Cortright et al. |
| 2005/0204030 A1 | 9/2005 | Koch et al. |
| 2006/0062205 A1 | 3/2006 | Doherty et al. |
| 2007/0100967 A1 | 5/2007 | Smith |
| 2007/0130338 A1 | 6/2007 | Malik |
| 2012/0078725 A1 | 3/2012 | Maitra et al. |
| 2013/0138513 A1 | 5/2013 | Malik |

OTHER PUBLICATIONS

U.S. Appl. No. 14/323,447, Jan. 5, 2016, Office Action.
U.S. Appl. No. 10/184,670, Dec. 29, 2014, Office Action.
U.S. Appl. No. 14/323,447, Jan. 16, 2015, Office Action.
U.S. Appl. No. 14/323,464, Jan. 16, 2015, Office Action.
U.S. Appl. No. 14/323,472, Jan. 15, 2015, Office Action.
U.S. Appl. No. 14/323,973, filed Jul. 3, 2014, Malik et al.
U.S. Appl. No. 14/325,039, filed Jul. 7, 2014, Malik et al.
U.S. Appl. No. 14/325,053, filed Jul. 7, 2014, Malik et al.
U.S. Appl. No. 14/448,725, filed Jul. 31, 2014, Malik et al.
U.S. Appl. No. 14/323,447, filed Jul. 3, 2014, Malik et al.
U.S. Appl. No. 14/323,464, filed Jul. 3, 2014, Malik et al.
U.S. Appl. No. 14/323,472, filed Jul. 3, 2014, Malik et al.
U.S. Appl. No. 14/323,969, filed Jul. 3, 2014, Malik et al.
U.S. Appl. No. 14/328,516, filed Jul. 10, 2014, Malik et al.
"Microsoft Outlook 2000 SR-1 Readme File," www.microsoft.com/assistance/offhelp/off2000/outlook/outlhlp9/html/olread9.htm, as of Apr. 30, 2002.
"Microsoft Outlook version 2002 (included in office XP)," Microsoft Outlook Product Guide, pp. 1-11.
"Microsoft Office," Microsoft Outlook 2000 Product Enhancements Guide, Oct. 1998.
Microsoft Outlook 2000 "About" screen capture printout (1 page).
Microsoft Outlook Programming, webpage printout (5 pages) retrieved from www.outlookcode.com, Apr. 17, 2006.
Gordon Padwick and Helen Ferddema, "Special Edition Using Microsoft Outlook", May 12, 1999.
Kox, Klass, Mobile Contextual Advertising: HAIT Master Thesis series nr. 08-005, pp. 1-27, Dec. 2008.
"Delivering dollars on demand: cable industry weighs different models to build revenue," Nov. 3, 2003; Braodcasting & Cable, v133, n44, p. S3, 8pp.
VH1, "Pop-Up Video," 1980s, VH1.com, www.vh1.com/shows/dyn/pop_up_video/series_about.html, pp. 1-2, retrieved May 2, 2007.
VH1, "Pop-Up Video," Oct. 26, 2002, VH1.com, web.archive.org/web/20021026183153/http://www.vh1.com/shows/dyn/pop_up_video/series_abouthtml, p. 1.
U.S. Appl. No. 09/966,703, Nov. 17, 2005, Office Action.
U.S. Appl. No. 09/966,703, May 26, 2006, Office Action.
U.S. Appl. No. 09/966,703, May 2, 2007, Office Action.
U.S. Appl. No. 09/966,703, Oct. 25, 2007, Notice of Allowance.
U.S. Appl. No. 10/109,909, Jul. 15, 2004, Office Action.
U.S. Appl. No. 10/109,909, Jan. 24, 2005, Office Action.
U.S. Appl. No. 10/109,909, Jul. 21, 2005, Notice of Allowance.
U.S. Appl. No. 10/184,588, Nov. 20, 2005, Office Action.
U.S. Appl. No. 10/184,588, Aug. 11, 2006, Office Action.
U.S. Appl. No. 10/184,588, Apr. 9, 2007, Office Action.
U.S. Appl. No. 10/184,588, Sep. 13, 2007, Office Action.
U.S. Appl. No. 10/184,588, Jan. 9, 2008, Office Action.
U.S. Appl. No. 10/184,588, Aug. 4, 2008, Office Action.
U.S. Appl. No. 10/184,588, Dec. 10, 2008, Office Action.
U.S. Appl. No. 10/184,588, May 21, 2009, Office Action.
U.S. Appl. No. 10/184,588, Nov. 10, 2009, Office Action.
U.S. Appl. No. 10/184,588, May 7, 2010, Office Action.
U.S. Appl. No. 10/184,588, Oct. 13, 2010, Office Action.
U.S. Appl. No. 10/184,588, Aug. 20, 2012, Notice of Allowance.
U.S. Appl. No. 10/184,670, Jun. 9, 2008, Office Action.
U.S. Appl. No. 10/184,670, Nov. 18, 2008, Office Action.
U.S. Appl. No. 10/184,670, Apr. 1, 2009, Office Action.
U.S. Appl. No. 10/184,670, Oct. 23, 2009, Office Action.
U.S. Appl. No. 10/184,670, May 26, 2010, Office Action.
U.S. Appl. No. 10/184,670, Nov. 24, 2010, Office Action.
U.S. Appl. No. 10/184,670, Aug. 14, 2013, Office Action.
U.S. Appl. No. 10/184,670, Nov. 26, 2013, Office Action.
U.S. Appl. No. 10/251,025, Nov. 4, 2005, Office Action.
U.S. Appl. No. 10/251,025, Apr. 24, 2006, Office Action.
U.S. Appl. No. 10/251,025, Jan. 5, 2007, Office Action.
U.S. Appl. No. 10/251,025, Jul. 5, 2007, Notice of Allowance.
U.S. Appl. No. 10/251,025, Jul. 20, 2007, Notice of Allowance.
U.S. Appl. No. 10/739,599, May 30, 2006, Office Action.
U.S. Appl. No. 10/739,599, Dec. 19, 2006, Office Action.
U.S. Appl. No. 10/739,599, May 9, 2007, Office Action.
U.S. Appl. No. 10/739,599, Jun. 28, 2007, Office Action.
U.S. Appl. No. 10/739,599, Mar. 17, 2008, Office Action.
U.S. Appl. No. 10/739,599, Aug. 19, 2010, Notice of Allowance.
U.S. Appl. No. 10/997,305, May 2, 2006, Office Action.
U.S. Appl. No. 10/997,305, Oct. 17, 2006, Office Action.
U.S. Appl. No. 10/997,305, Apr. 10, 2007, Office Action.
U.S. Appl. No. 10/997,305, Dec. 18, 2007, Office Action.
U.S. Appl. No. 10/997,305, May 19, 2008, Office Action.
U.S. Appl. No. 10/997,305, Oct. 6, 2008, Notice of Allowance.
U.S. Appl. No. 11/236,907, May 2, 2006, Office Action.
U.S. Appl. No. 11/236,907, Oct. 19, 2006, Office Action.
U.S. Appl. No. 11/236,907, Mar. 6, 2007, Office Action.
U.S. Appl. No. 11/236,907, Aug. 24, 2007, Office Action.
U.S. Appl. No. 11/236,907, Jan. 25, 2008, Office Action.
U.S. Appl. No. 11/236,907, Aug. 7, 2008, Notice of Allowance.
U.S. Appl. No. 11/638,546, Apr. 10, 2009, Office Action.
U.S. Appl. No. 11/638,546, Oct. 8, 2009, Office Action.
U.S. Appl. No. 11/638,546, Feb. 6, 2012, Office Action.
U.S. Appl. No. 11/638,546, Jul. 18, 2012, Office Action.
U.S. Appl. No. 11/638,546, Aug. 2, 2013, Office Action.
U.S. Appl. No. 11/638,546, Feb. 10, 2014, Office Action.
U.S. Appl. No. 11/900,153, Dec. 3, 2010, Office Action.
U.S. Appl. No. 11/900,153, Apr. 21, 2011, Office Action.
U.S. Appl. No. 11/900,153, Jun. 21, 2012, Notice of Allowance.
U.S. Appl. No. 12/335,792, May 23, 2011, Office Action.
U.S. Appl. No. 12/335,792, Apr. 20, 2012, Office Action.
U.S. Appl. No. 12/335,792, Oct. 2, 2012, Office Action.
U.S. Appl. No. 12/335,792, Jun. 20, 2013, Notice of Allowance.
U.S. Appl. No. 12/948,962, Dec. 5, 2012, Office Action.
U.S. Appl. No. 12/948,962, Jun. 12, 2013, Notice of Allowance.
U.S. Appl. No. 13/687,068, Jan. 2, 2014, Office Action.
U.S. Appl. No. 13/687,068, Oct. 7, 2014, Office Action.
U.S. Appl. No. 10/184,670, Jul. 9, 2015, Office Action.
U.S. Appl. No. 11/638,546, Jul. 13, 2015, Office Action.
U.S. Appl. No. 13/687,068, Jun. 24, 2015, Office Action.
U.S. Appl. No. 14/323,447, Jun. 24, 2015, Office Action.
U.S. Appl. No. 14/323,464, Jun. 25, 2015, Office Action.
U.S. Appl. No. 14/323,472, Jun. 25, 2015, Office Action.
U.S. Appl. No. 13/687,068, Aug. 24, 2018, Office Action.
U.S. Appl. No. 14/323,464, Sep. 11, 2018, Office Action.
U.S. Appl. No. 14/325,053, Aug. 28, 2018, Office Action.
U.S. Appl. No. 14/325,039, Oct. 4, 2018, Office Action.
U.S. Appl. No. 14/448,725, Oct. 4, 2018, Office Action.
U.S. Appl. No. 14/328,516, Sep. 27, 2018, Office Action.
U.S. Appl. No. 11/638,546, Feb. 16, 2018, Office Action.
U.S. Appl. No. 13/687,068, Jan. 29, 2018, Office Action.
U.S. Appl. No. 14/323,464, Dec. 28, 2017, Office Action.
U.S. Appl. No. 14/325,053, Dec. 13, 2017, Office Action.
U.S. Appl. No. 14/325,039, Mar. 14, 2018, Office Action.
U.S. Appl. No. 14/328,516, Dec. 13, 2017, Office Action.
U.S. Appl. No. 14/323,464, Apr. 23, 2018, Office Action.
U.S. Appl. No. 14/448,725, Apr. 20, 2018, Office Action.
U.S. Appl. No. 14/323,464, May 17, 2019, Notice of Allowance.
U.S. Appl. No. 14/325,053, Apr. 25, 2019, Office Action.
U.S. Appl. No. 14/328,516, May 24, 2019, Office Action.

(56) References Cited

OTHER PUBLICATIONS

U.S. Appl. No. 14/323,447, Jul. 25, 2016, Office Action.
U.S. Appl. No. 14/323,973, Jun. 9, 2016, Office Action.
U.S. Appl. No. 10/184,670, Jul. 27, 2017, Office Action.
U.S. Appl. No. 14/323,447, Jul. 28, 2017, Office Action.
U.S. Appl. No. 14/448,725, May 23, 2017, Office Action.
U.S. Appl. No. 10/184,670, Jan. 13, 2017, Office Action.
U.S. Appl. No. 11/638,546, Mar. 28, 2017, Office Action.
U.S. Appl. No. 14/325,053, Apr. 3, 2017, Office Action.
U.S. Appl. No. 14/325,039, Apr. 5, 2017, Office Action.
U.S. Appl. No. 14/328,516, Apr. 5, 2017, Office Action.
U.S. Appl. No. 14/325,039, Dec. 19, 2019, Office Action.
U.S. Appl. No. 14/325,039, dated Jun. 16, 2020, Office Action.
U.S. Appl. No. 14/448,725, dated Sep. 18, 2020, Notice of Allowance.

* cited by examiner

MESSAGE LOG

| FROM | TYPE | SUBJECT | DATE |
|---|---|---|---|
| MAUDE DAVIS | E-MAIL | CHEF JEAN-LOUIS RESTAURANT | 5-21-99 |
| BILL JONES | VOICE MESSAGE | (703) 345-6789 | 5-20-99 |
| JOHN ELLIOT | FAX | CLOSING | 5-15-99 |
| DALE MALIK | WIRELESS CALL | (404) 234-5678 | 5-14-99 |
| EMILY GUIDA | INSTANT MESSAGE | HOME SICK | 5-14-99 |
| USER | CHAT ROOM MESSAGE | ADOPTION | 5-13-99 |
| MARCUS DELGADO | PAGE | (770) 249-0972 | 5-12-99 |
| NANCY WOODARD | I-PAGE | STATUS REPORT | 5-5-99 |

FIG. 2

| PROFILE INFORMATION - USER | | |
|---|---|---|
| COMMUNICATION DEVICES | SERVICES | |
| TELEPHONE | BRAND X | |
| LOCAL SERVICE | BELLSOUTH | |
| LONG DISTANCE SERVICE | AT&T | |
| WIRELESS UNIT | MOTOROLA | |
| SERVICE | CINGULAR | |
| COMPUTER | DELL | |
| E-MAIL SERVICE | MICROSOFT | |

FIG. 3

METHODS AND SYSTEMS FOR PROVIDING CONTEXTUAL INFORMATION

RELATED APPLICATION

The present application is a continuation of U.S. patent application Ser. No. 14/323,969, filed Jul. 3, 2014, which is a continuation of U.S. patent application Ser. No. 10/184,670, filed Jun. 28, 2006, which is a continuation in part of U.S. patent application Ser. No. 09/966,703, filed on Sep. 28, 2001 now issued as U.S. Pat. No. 7,313,617. Each of the aforementioned patent(s) and application(s) is hereby incorporated by reference in its entirety.

FIELD OF THE INVENTIONS

The inventions relate to methods and systems of providing contextual information relating to communication devices and/or communication services to a user.

BACKGROUND

Consumers are inundated with marketing and the advertising of new products and services. A lot of this advertising is wasted because consumers do not always pay attention to the advertising. The trick then, as marketing executives have known for a long time, is to get the consumers to pay attention.

When would a consumer pay attention to advertising? A consumer may pay attention to advertising if the products or services being advertised have some relevance to the consumer. For example, a consumer may pay attention to advertising presented at a time when the consumer's interest is heightened with respect to the products or services being advertised. A consumer's interest generally is heightened when he or she is using or thinking about a product or service. Thus, advertising presented when the consumer is using or thinking about a product or service may be more successful in grabbing the consumer's attention than when the same advertising is presented at other times. Advertising presented when the consumer is using or thinking about a product or service is referred to as "contextual advertising".

With respect to communication devices and services, it has been difficult to present contextual advertising to a consumer. As noted, contextual advertising is advertising that is relevant to the consumer when presented. Contextual advertising of communication devices or services could be presented when a consumer is using a communication device and/or service. But when a consumer is using a communication device and/or service, generally most of the consumer's attention is given to the communication in progress. The consumer talking on a telephone or wireless unit typically is fully engaged in a conversation, and advertising presented during the conversation, even though it is contextual advertising, goes largely unnoticed.

Accordingly, there is a need for a method or system to deliver contextual advertising of communication devices and/or services in such a manner as to gain the attention of consumers.

SUMMARY

Stated generally, the inventions provide a user with contextual information such as contextual advertising of communication devices and/or services. Advantageously, the contextual information is presented to a user at a time when the user's interest in the communication devices and/or services is heightened. As a result, the user may pay more attention to the information than otherwise, and it is more likely the user may act on the information.

The inventions take advantage of a user's heightened interest in communication devices and services demonstrated at various times in the use of features of a communications manager. For example, a user's interest is interpreted as a heightened interest when the user accesses his or her profile information or message log in the communications manager. As another example, the user's interest is interpreted as heightened when the user makes an effort or otherwise initiates a communication with a communicating partner. During the user's heightened interest, the user is provided with the option of being presented with contextual information. The user is presented with the option so as not to cause the contextual information to be considered as annoying or bothersome. If the user responds positively, then the contextual information presented.

More particularly, the inventions may be implemented through the use of a communications ("com") manager operating in a personal computer (PC) of a user. The com manager may store profile information relating to the user. The profile information may indicate the communication devices and/or communication services of the user. In particular, the profile information may indicate the type, brand, features, functionalities, specifications, configurations, etc. of the communication device or service.

The user may cause the com manager to display the profile information on the screen of the computer. If the user activates an entry in the profile information, such activation is noted, and a determination is made as to whether the activated entry identifies a communication device and/or communication service. The identification may include the type, brand, features, functions, specifications, configurations, etc. of the communication device and/or communication service. At this point, the user's interest in identified communication devices and/or communication services is heightened because the user has activated an entry including the identified communication devices and/or communication services in his or her profile information. With the user's interest heightened, it is a good time to present contextual advertising to the user.

The user, however, may find it annoying or bothersome to be presented with contextual advertising when the user activates an entry in his or her profile information. If the user finds the contextual information to be annoying or bothersome, then the presentation of the contextual information may have an undesirable negative impact on the user.

Advantageously, the inventions include a mechanism with respect to the presentation of the contextual information so that any annoyance or bother is minimized. As a convenience to the user, a query appears on the computer screen inquiring whether the user would like contextual information about the communication device and/or communication service. Thus, a user may avoid the presentation of the contextual information or select such presentation.

The query presented to the user may inquire whether the user would like to see contextual information about the type, brand, features, functions, specifications, etc. of the communication device and/or communication service. If the user responds positively, then the contextual information may be presented to the user. The user's positive response to the query also may be interpreted as a demonstration of a particularly heightened interest in the contextual information. Thus, the presentation of the contextual information may be particularly effective.

As explained above, the com manager may store profile information about the user, and the user may be presented with contextual information through the use of his or her profile information. But the user may be presented with contextual information in other ways. For example, the user may be presented with contextual information through the use of a message log provided by the com manager. The com manager may provide the message log including, respectively, entries for communications of the user. Each entry may include types of data relating to a communication. The user can display the message log on a computer screen. The user may activate a type of data in an entry of the message log relating to a communication. At this point, the user's interest in the data in the entry in the message log is heightened because the user has activated the data in the entry in his or her message log. With the user's interest heightened, it is a good time to present contextual advertising to the user.

With respect to the message log, the type of data in an entry that may be activated may include an identification of a communicator, a communication device, a communication service, a subject, and/or a date. The activation is noted and a query is displayed. Advantageously, as with the profile information, the user is provided with an opportunity to accept or decline the presentation of the contextual information through the mechanism of the query. The query inquires whether the user would like to be presented with contextual information based on the activated type of data in the entry. If the user responds positively to the query, then the contextual information is presented to the user.

Another instance of a user's heightened interest in communication devices and/or services is the user's effort at communication with a communicating partner. To take advantage of this instance of heightened interest, the inventions provide mechanisms for presenting contextual information to the user.

The com manager may store profile information relating to a communicating partner of the user. The profile information may indicate a preferred communication device and/or communication service of the communicating partner. The com manager notes an effort by the user to communicate with the communicating partner. The identification of the communicating partner is used to check the profile information of the communicating partner for the preferred communication device and/or communication service of the communicating partner. The preferred communication device and/or service of the communicating partner is compared with the communication devices and/or services of the user.

Based on the comparison, a determination may be made that the user has or does not have a communication device and/or a communication service corresponding to the preferred communication device of the communicating partner. If the user does not have such a communication device and/or communication service, the inventions take advantage of the situation to ask whether the user would like to see contextual information. If the response is positive, then the contextual information is presented.

As with the profile information and the message log, the user is not automatically presented with contextual information when a comparison yields a difference between the user's devices/services and the communicating partner's preferred device/service. Instead, so as not to annoy the user with unwanted contextual information, the user is presented with a query. The user is asked whether the user would like contextual information on the preferred communication device and/or service of the communicating partner. If a positive response is received, then the contextual information is presented to the user.

Generally, with respect to contextual information, the com manager may be in direct or functional control of the contextual information to be presented to the user. Alternatively, the com manager may take action to obtain the contextual information. For example, the com manager may obtain the contextual information from a gateway in a data network or from a telecommunications manager in a communications network. As yet another alternative, the com manager may be provided with particular contextual information to present to the user as the opportunity arises. For example, a service provider of wireless service may provide an updated service program advertisement to the com manager. Of course, the service provider may post the contextual information with a telecom manager in the PSTN or a server in a data network for retrieval by the com manager.

In sum, the inventions allow for the delivery of contextual information such as advertising of communication devices and/or services in such a manner as to gain the attention of a user. The inventions take advantage of instances of a user's heightened interest in the subject matter. For example, the contextual information may be delivered in connection with a user's activation of an entry in profile information or message log relating to the user's communications. Further, the contextual information may be presented in connection with a communication initiated by the user to a communicating partner. Moreover, the contextual information is presented at the direction of the user in response to a query to avoid being annoying or burdensome to the user. Thus, the contextual information is presented to a user at a time when the user's interest in the communication devices and/or services is heightened, and the user is more likely to act on the presented information.

BRIEF DESCRIPTION OF THE DRAWINGS

FIG. 2 illustrates an exemplary message log as may be used with the inventions.

FIG. 3 illustrates an example of profile information as may be used with the inventions.

DETAILED DESCRIPTION

Figure 1:
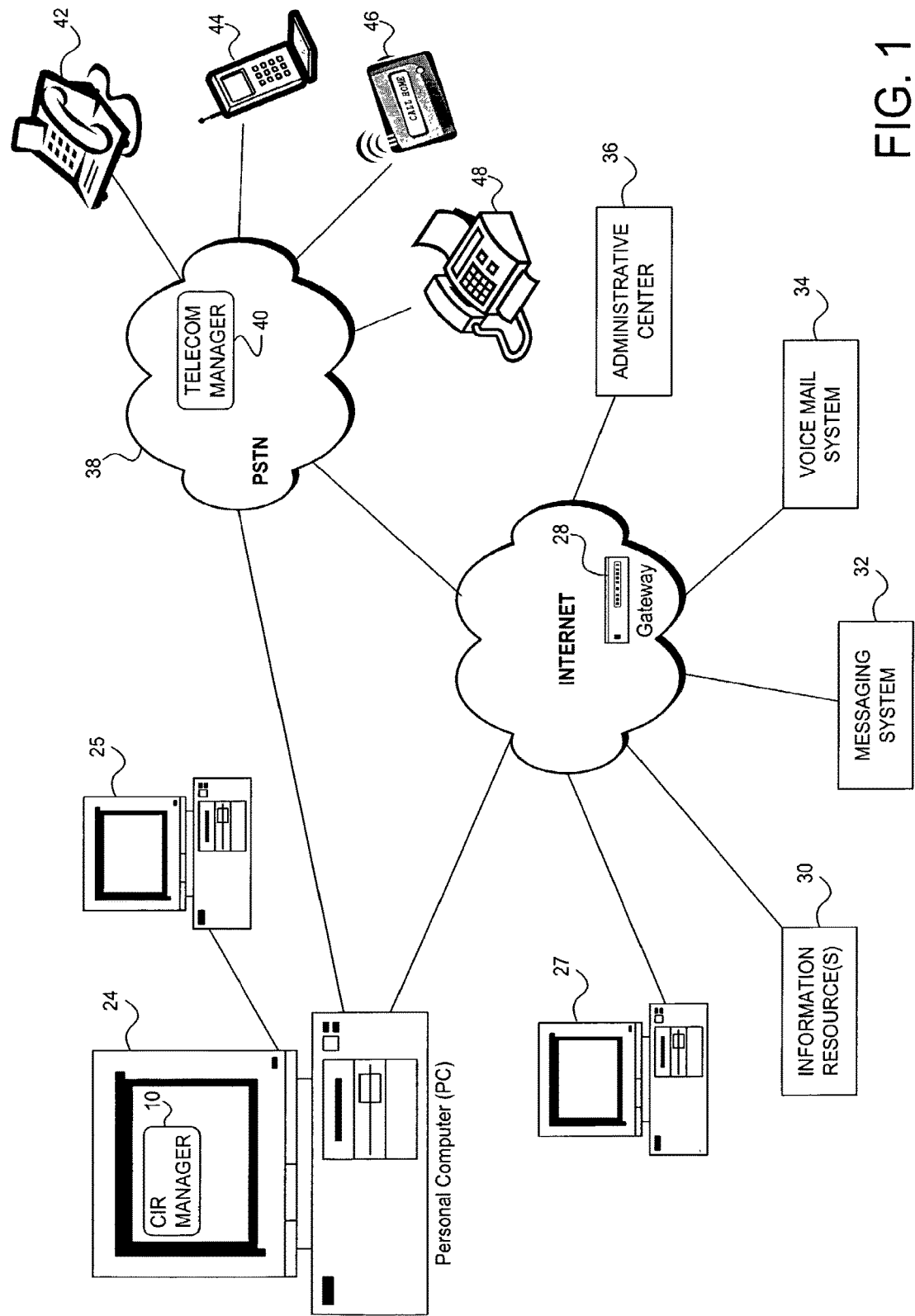
FIG. 1 illustrates an exemplary environment for operation of the inventions.

The inventions provide contextual information regarding communication devices and/or services. For example, a user may review his or her communication devices and/or services by reviewing his or her profile information stored by a communications ("com") manager. The user may activate an entry in the profile information such as an entry relating to wireless units. As a result, a query appears inquiring whether the user would like information about wireless units. If the response is positive, then information about wireless units is presented.

Advantageously, the information regarding wireless units is provided at a time when the user's interest in wireless units is heightened as a result of the user's check of the profile information. Thus, the likelihood of the user's paying attention to, and acting on, the information presented about wireless units is heightened.

In addition to the inventions described herein, additional inventions relating to the presentation of contextual information are described in the commonly owned and assigned patent application entitled Methods and Systems for Providing Contextual Information on Communication Devices and Services, filed concurrently with this application in the United States Patent and Trademark Office, and which is incorporated herein by reference.

As noted, the inventions may be implemented through the use of a communications ("com") manager. In a related patent application, a communications and information resource (CIR) manager is described. See U.S. patent application Ser. No. 09/966,703, entitled "Methods and Systems for a Communications and Information Resource Manager," filed Sep. 28, 2001, which is incorporated herein by this reference. The CIR manager may be used to implement the inventions described in this application. Prior to describing the inventions, some background about the CIR manager is provided.

The CIR Manager

A CIR manager may function as a "super" manager with respect to the communications devices, services, and systems of a user. In particular, the CIR manager may be used to centralize communications activities and information such that the user does not have to (but may) use multiple communications devices. For example, the CIR manager may be used to keep a log of all types of communications related to the user—whatever the device, whatever the service, whatever the network.

An advantage of the CIR manager is the user does not have to check or use each type of device for its own type of messages. Another advantage is the CIR manager may obtain information from resources including third party resources so as to facilitate communications and information gathering activities of the user. With the CIR manager, the user is provided with a centralized, efficient, and user-friendly way to handle communications activities including ways to receive, view, listen to, play, respond to, store, log, monitor, delete, copy, forward, obtain, create, and to take other actions. Moreover, the CIR manager provides the user with personalized management of communications and information resources.

In addition, in managing the communications and information resources of the user, the CIR manager may provide the user with one or more of the following features and advantages:

Recognition of the user and of others as authorized by the user;
Remembrance and implementation of authorized users' preferences;
Aid in finding information and resources;
Information related to an authorized users' activities and communications including call management and detail;
Service set-ups, configurations, changes, deletions, additions, updates, and synchronizations;
Maintenance of user account and preference information, logs, activity logs, schedules, calendars, general directories, personal directories, and the like;
Unified messaging including notice to the user relating to communications and/or other actions; and
Suggestions, help, updates, reminders, warnings, alerts, and other comments.

The CIR manager may integrate the features described above pursuant to a user's preferences so as to provide efficient, organized, and user-friendly communications and information resource management.

Even though the inventions are described herein by reference to a CIR manager installed in a personal computer (PC), the inventions may be practiced with other computer system configurations, including hand-held devices, multi-processor systems, microprocessor based or programmable consumer electronics, mini-computers, mainframe computers, etc.

Exemplary Operating Environment of a CIR Manager—FIG. 1

Exemplary functions of a CIR manager 10 are described above. To provide these functions and others, the CIR manager 10 may interact with a variety of systems, networks, and elements that may be directly connected to the CIR manager 10, may be hosted by the same host(s) as the CIR manager 10, may be functionally connected to the CIR manager 10, and/or may be accessible to the CIR manager 10 either directly and/or through other systems, networks, and/or elements.

FIG. 1 illustrates an exemplary operating environment of a CIR manager 10 implemented on a personal computer (PC) 24. For details of an exemplary PC 24 as may be used with the CIR manager 10, see the previously referenced related application U.S. patent application Ser. No. 09/966,703, entitled "Methods and Systems for a Communications and Information Resource Manager," filed Sep. 28, 2001.

The operating environment of FIG. 1 illustrates the CIR manager 10 may communicate through the PC 24 with another computer(s) 25 connected or otherwise networked with the PC 24. The CIR manager 10 also may communicate through the Internet 26 with one or more of the following or other devices:

Other computer(s) 27;
A gateway 28 serving the CIR manager 10;
An information resource 30 such as a database;
A messaging system 32;
A voicemail system 34;
An administrative center 36; and
The public switched telephone network (PSTN) 38.

In addition, the CIR manager 10 may communicate through the PSTN 38 with one or more of the following or other devices:

A telecommunications manager 40;
A telephone (wireline unit) 42;
A wireless unit 44;
A pager 46; and
A fax device (not illustrated).

The CIR manager 10 may have access to other computers 25 through local area networks (LANs), wide area networks (WANs), direct connections, and other networks.

The CIR manager 10 also may have access through the PC 24 to a global communications network such as the Internet 26, and through the Internet 26 to other units, networks, and systems. Particularly, the CIR manager 10 may communicate with a gateway 28 connected to or operating on the Internet. The gateway 28 may be a service platform, server, or other device. The gateway 28 may be provided by the service provider of the CIR manager 10, and may serve the CIR manager 10. Communications activities to and from the CIR manager 10 on the PC 24 may be directed to the gateway 28 and/or may pass through the gateway 28 to other systems, networks, and/or elements. In passing through the gateway 28, the communications activities may be facilitated by the gateway 28.

For example, assume a user is a new subscriber to the CIR manager 10. In setting up the user for services available through the CIR manager 10, the CIR manager 10 may send a communication to the gateway 28 for routing to the appropriate element to handle such set-up activities. In an exemplary embodiment, Administrative Center 36 may handle administrative matters including set-up activities for the service provider. The gateway 28 delivers or otherwise routes the communication to the Administrative Center 36 for the set-up activity. The Administrative Center 36 may respond to the gateway 28 with questions, information, and instructions for the CIR manager 10.

Another way in which the gateway 28 may facilitate communications activities of the CIR manager 10 is to function as a router or director of communications and messages. For example, the CIR manager 10 may forward a request for data to the gateway 28. The gateway 28 may determine the data may be obtained from the information resource 30. The gateway 28 then forwards the request for data or the appropriate message to the information resource 30. The information resource 30 may respond to the CIR manager 10 or to the gateway 28, which then communicates with the CIR manager 10.

Further, the gateway 28 may facilitate communications activities between the CIR manager 10 and the PSTN 38, and other elements reached through the PSTN 38 such as the telecom manager 40, and the communications devices including the wireline unit 42, the wireless unit 44, the pager 46, and the fax device 48. Generally, the telecom manager 40 provides general functions and features related to communications of a user. Specifically, the telecom manager 40 may be implemented in a computer, on a service platform, in a network node, or other device. The telecom manager 40 may include connections to devices and networks through integrated services digital network (ISDN) lines and signaling system 7 (SS7) data links. The telecom manager 40 may be capable of functions similar to those of a service switching point (SSP) or service node (SN) of an Advanced Intelligent Network (AIN). For example, the telecom manager 40 may have the following capabilities: signaling, call set-up, routing, and access to databases.

Exemplary Message Log—FIG. 2

FIG. 2 illustrates an exemplary message log 50 such as may be provided by the CIR manager 10 and used in connection with the inventions described herein. Message log 50 includes entries relating to the exemplary user's communications using the CIR manager 10. Specifically, message log 50 includes eight entries 52, 54, 56, 58, 60, 62, 64, and 66. Each entry includes data 68, and in this example, each entry includes four types of data: "from" 70; "type" 72; "subject" 74; and "date" 76. The from data 70 refers to the source or origin of the communication. The type data 72 refers to the type or kind of communication. The subject data 74 refers to the content, the substance, or other feature of the communication. The date data 76 refers to the date of receipt (or transmittal if from the user) of the communication.

Exemplary Profile Information—FIG. 3

The CIR manager may store profile information 102 about a user. Profile information about the user's communicating partners also may be stored as is described below in connection with FIG. 8. FIG. 2 illustrates in block diagram form the profile information 102 that may be stored about a user.

The profile information 102 for the user may include, among other things, a list of the communication devices and services used by the user. In this example, the user has three communication devices: a telephone 104; a wireless unit 106; and a computer (PC) 108. Each of the entries for the respective devices may include a description of the respective device. For example, the telephone 104 is described as Brand X. The wireless unit 106 is described as a Motorola unit. The computer 108 is described as a Dell unit. The descriptions of the devices provided herein are minimal as they are examples only. Generally, the description of a device includes as much information as necessary to be useful in the comparison process described below. For example, the description of a wireless unit may include its brand, trademark, type, operating specifications, functions, and features.

Also in this example, the user makes use of four communication services. Each service is included in the profile information relating to the user and associated with the appropriate device. Further, each of the services is described in the profile information. As FIG. 2 illustrates, the telephone 104 is associated with local (communication) service 110 from BellSouth and long distance service 112 from AT&T. The wireless unit 106 is associated with service 114 from Cingular. The computer 108 is associated with e-mail service 116 from Microsoft. As with the communication devices, the description of a communication service in the profile information includes as much information as necessary to be useful in the comparison process described below. For example, the description of a long distance service may identify the service provider and operating specifications, functions and features.

Figure 4:
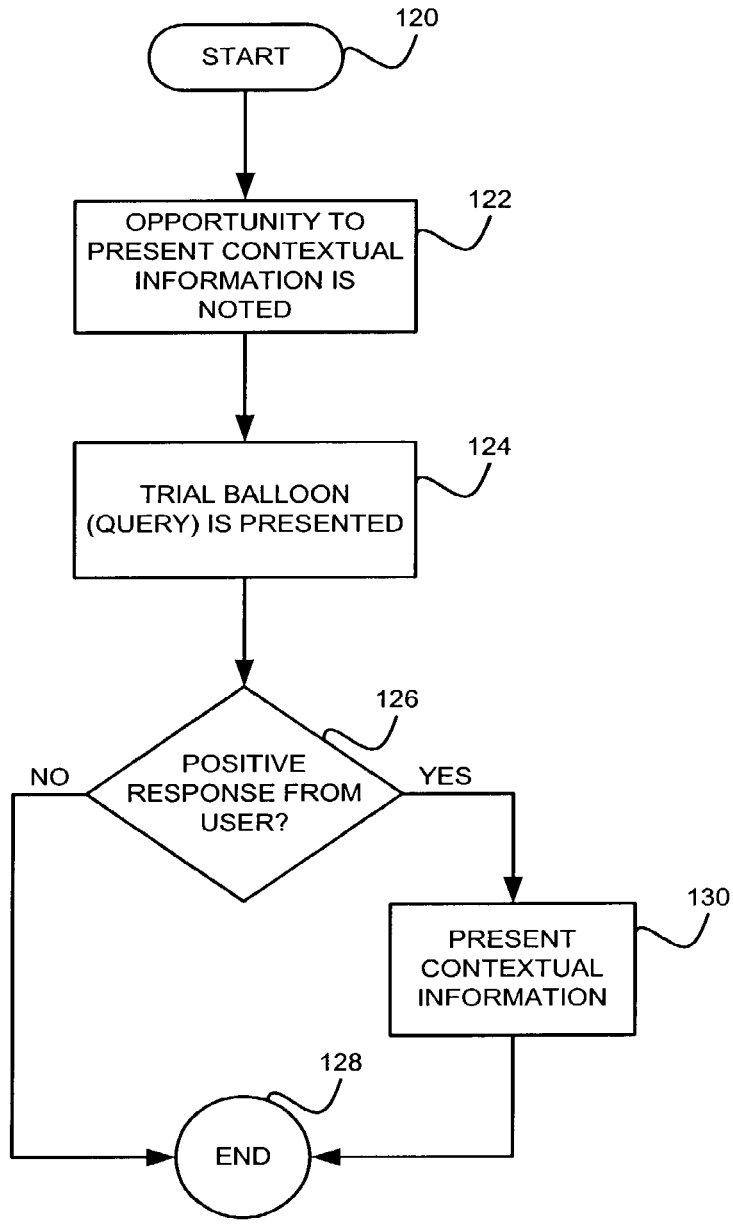
FIG. 4 is a flow chart illustrating exemplary actions of the inventions.

An Exemplary Process of the Presentation of Contextual Information—FIG. 4

FIG. 4 is a flow chart illustrating exemplary actions of the inventions in presenting contextual information to a user. The actions described in connection with FIG. 4 are further referenced through the description of examples provided below in connection with FIGS. 5-6.

After start action 120, an opportunity to present contextual information is noted in action 122. Such an opportunity may be presented by the user's access to his or her profile information or message log, by the user's initiation of a communication, or other event. In response to noting the opportunity, preliminary information is presented to the user in action 124. The preliminary information may be a query inquiring of the user whether he or she desires to be presented with contextual information. The query also may be referred to as a "trial balloon" when the query is presented on a computer screen such as text in the form of a circumscribed question.

In decision action 126, if the user provides a negative response to the query, then the process ends in end action 128. A failure to respond to the query may be set as a default negative response to the query. But if the user provides a positive response to the query, then the contextual information is presented in action 130. Thereafter, the process ends in end action 128.

Figure 5:
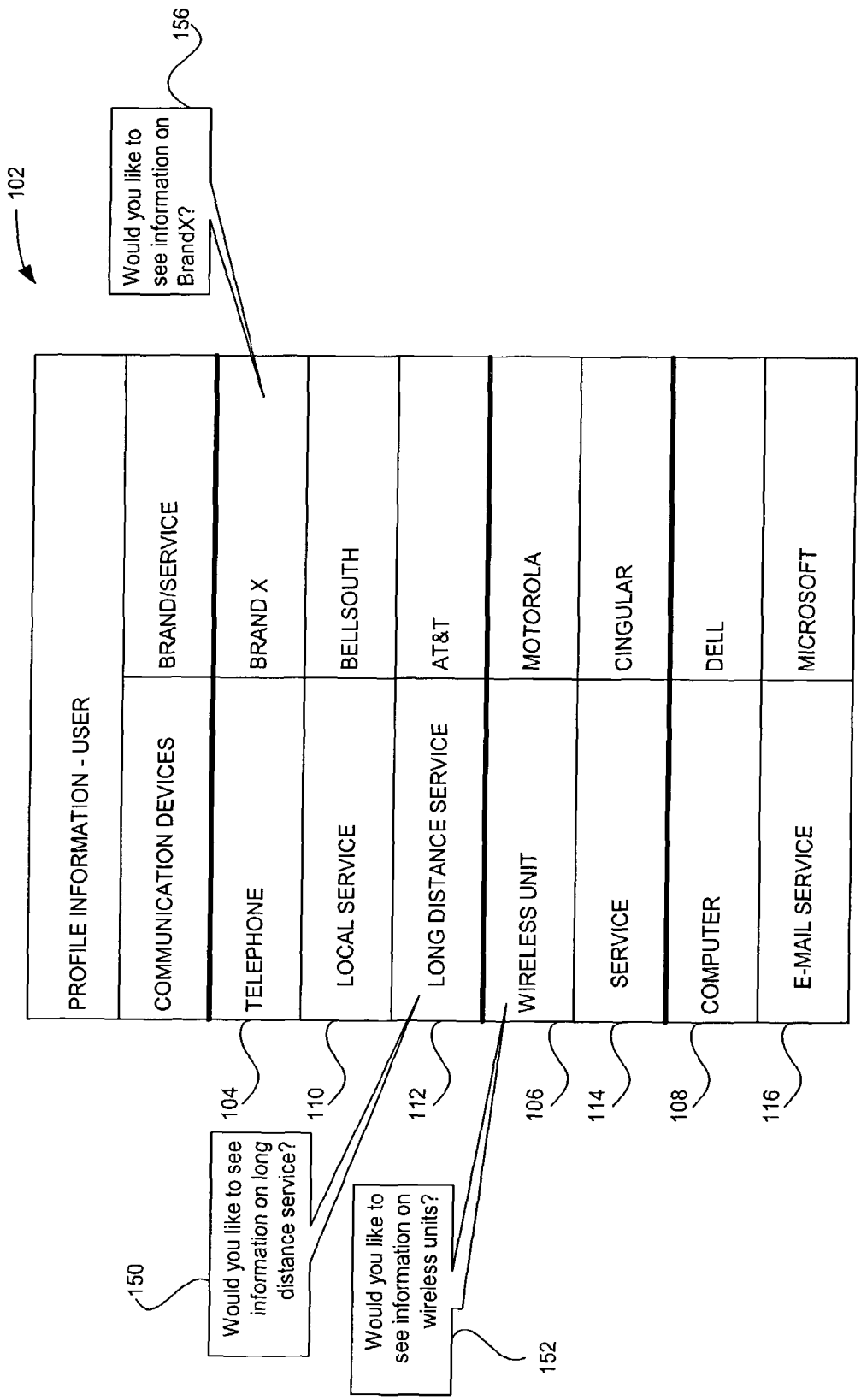
FIG. 5 illustrates an example of profile information including contextual information as may be used with the inventions.

Exemplary Presentation of Contextual Information with Profile Information—FIG. 5

The above-described exemplary process of the presentation of contextual information is now described in further detail by reference to an example including the profile information of the user originally described above in connection with FIG. 3.

FIG. 5 illustrates the profile information 102 of the user as illustrated in FIG. 3, but FIG. 5 also illustrates three trial balloons 150, 152, 154 that may be presented to the user with regard to the presentation of contextual information. As a first example, assume the user is checking his or her profile information 102. The user activates the entry 112 corresponding to long distance service in the profile information 102. The activation of the entry may indicate an opportunity to present the user with contextual information. As a result of the activation, the user is presented with a query as to whether the user would like contextual information on the activated entry. In this example, trial balloon 150 includes text that asks the user: "Would you like to see information on long distance service?" This particular trial balloon 150 is presented to the user because the user activated the entry 112 corresponding to long distance service in the profile information. If the user had activated a different entry, then a different query may be presented in the trial balloon.

The user may decline or accept through use of yes/no options (not illustrated) or otherwise. If the user declines, then the trial balloon 150 disappears. If the user accepts, then the trial balloon 150 disappears and is replaced with a presentation of contextual information. Alternatively, the trial balloon 150 remains on the screen, for example, until the user finishes with the contextual information or the trial balloon 150 is otherwise is caused to disappear from the screen.

In this example, the contextual information relates to long distance service such as advertising for a particular long distance carrier. The contextual information may be stored by or readily obtainable by the com manager. Alternatively, the contextual information may be obtained by or provided to the com manager through a telecommunications manager 40 in the PSTN 38, or through a gateway 28 in a data network 26 (see FIG. 1). For example, the com manager may present the contextual information on long distance service by linking to a web site of a particular long distance carrier.

As another example, assume the user is interested in acquiring a new or different wireless unit. The user activates the entry 106 corresponding to wireless units in the profile information 102. The user's activation of the entry 106 corresponding to wireless units is interpreted as showing a heightened interest in wireless units. If the user's interest is understood to be heightened, then an opportunity to present contextual information exists.

In this example, the user is presented with trial balloon 152 that includes the following text: "Would you like to see information on wireless units?" The presentation (or non-presentation) of contextual information proceeds as described above in connection with the previous example of a user's activation of the entry 112 relating to long distance service in the profile information 102.

As yet another example, assume the user is interested in a particular manufacturer, provider or brand of telephone. Advantageously, the inventions allow the user to "drill down" and obtain contextual information on particular elements in an entry of the profile information. In this example, the entry 102 for "telephone" in the profile information 102 identifies the user's telephone as "Brand X". The user may activate a particular element of an entry, such as the "Brand X" element, and obtain contextual information on that element.

In this example, the user is presented with trial balloon 154 that includes the following text: "Would you like to see information on Brand X?" If the user answers positively, then more drill-down possibilities may exist. Another trial balloon (not illustrated) may be presented to the user that presents the user with models of Brand X and asks whether the user would like to have information on any of the models. The drill-down trial balloons may continue until the appropriate level of details is reached. The presentation (or non-presentation) of contextual information proceeds as described above in connection with the previous examples of a user's activation of the entry 112 relating to long distance service or the entry 106 relating to wireless units in the profile information 102.

In the three examples described in connection with FIG. 5, three different kinds of contextual information are made available to the user, to-wit: long distance service information; wireless unit information; and information about Brand X. By these three examples, the generality of the definition of contextual information is made apparent. Contextual information generally is any type of information that may be associated with or related to a term or element identified by the user. Contextual information may include advertising, marketing, education, consumer, technical, sales, service, safety, quantity, cost, or quality information, etc.

Figure 6:
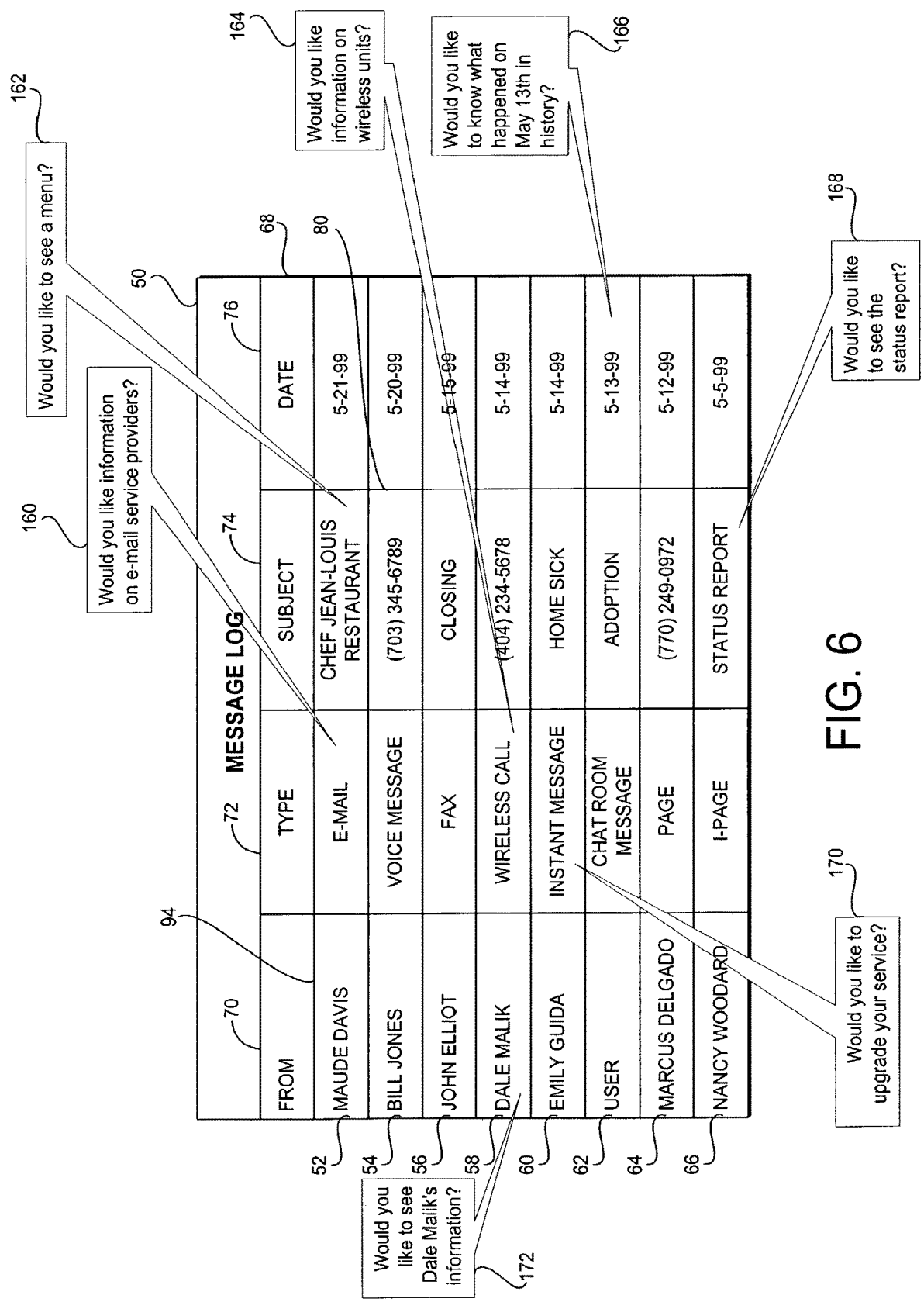
FIG. 6 illustrates an exemplary message log including contextual information as may be used with the inventions.

Exemplary Presentation of Contextual Information with a Message Log—FIG. 6

The general process of the presentation of contextual information in connection with a message log is the same as with the profile information 102 described above. Thus, the seven examples presented in association with a message log are set forth in abbreviated form below.

FIG. 6 illustrates a message log 50 of the user as illustrated in FIG. 2, but FIG. 6 also illustrates seven trial balloons 160, 162, 164, 166, 168, 170, and 172 that may be presented to the user with regard to the presentation of contextual information. As a first example, assume the user is checking his or her message log and notes the entry 52 regarding Maude Davis' e-mail. The user activates the part of entry 52 corresponding to the identification of the type of communication from Maude Davis, i.e., e-mail. In this example, trial balloon 160 includes text that asks the user: "Would you like to see information on e-mail service providers?"

Typically, the query or trial balloon presented to the user relates to the contextual information to be provided. The query or trial balloon may include a general question about the activated term, i.e., "Would you like information about e-mail?" The query or trial balloon may include a more particular or directed question about the activated term, i.e., "Would you like information about e-mail service?" or "service providers?" or "technical description of e-mail?" Of course, the query or trial balloon may include more than one question. In fact, as noted above, the query may provide a set of questions that "drill down" from the general to the specific so as to determine with greater particularity the type of contextual information sought by the user. For example, if the user responds positively to trial balloon 160 ("Would you like information on e-mail service providers?"), the trial balloon 160 may substitute a specific question such as: "Which e-mail service providers would you like information on?" or "Which of the following three e-mail service providers (A, B, C) would you like information on?". Advantageously, the inventions provide the contextual information based on the responses of the user.

Referring again to FIG. 6, an additional six examples of queries/contextual information are described that may be presented to the user as follows:

- User activates the "subject" in entry 52 corresponding to Maude Davis' e-mail. The "subject" is "Chef Jean-Louis Restaurant". The following query 162 is presented: "Would you like to see a menu?" If the answer is "yes", then the inventions may link to the restaurant's website so as to present a menu.
- User activates the "subject" in entry 54 corresponding to Bill Jones' voice message. The "subject" is a wireless number: "(703) 345-6789". The following query 164 is presented: "Would you like information on wireless units?"
- User activates the "date" in entry 62 corresponding to the user's chat room message. The "date" is "5-13-99". The following query 166 is presented: "Would you like to know what happened on May 13$^{th}$ in history?"
- User activates the "subject" in entry 66 corresponding to Nancy Woodard's i-page. The "subject" is "status report". The following query 168 is presented: "Would you like to see the status reports?" If the answer is "yes", then the user may be presented with the status reports. For example, the user may keep electronic versions of the status reports in his or her word processing program stored in the PC. The com manager may have a path set up so as to be able to retrieve the status reports for presentation to the user in response to an affirmative answer to the query 168.
- User activates the "type" in entry 60 corresponding to Emily Guida's instant message. The "type" is "instant message". The following query is presented to the user: "Would you like to upgrade your service?" If the answer is "yes", then the com manager may compare the version of the user's service (as detailed in the user's profile information in the coin manager) to upgraded versions. The com manager may offer the user various options. With the user's selection, the com manager may contact the appropriate service provider and cause the user's service to be upgraded.
- User activates the "from" in entry 58 corresponding to Dale Malik's wireless call. The "from" is "Dale Malik". The following query is presented to the user: "Would you like to see Dale Malik's information?" The com manager may store profile information on communicating partners of the user. If the user responds positively to the query, then the com manager may present the user with Dale Malik's profile information as the contextual information.

Figure 7:
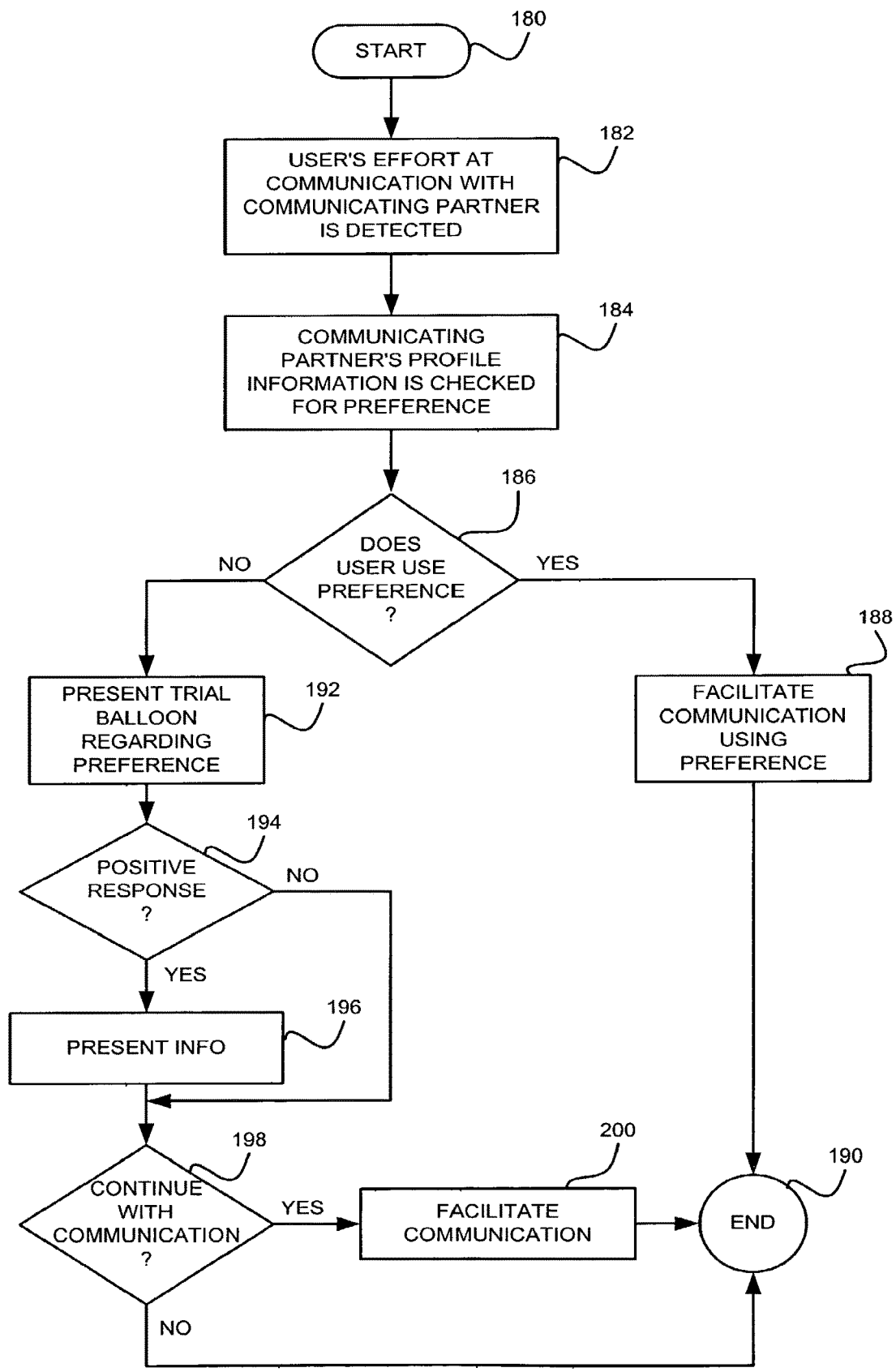
FIG. 7 is a flow chart illustrating exemplary actions of the inventions.

An Exemplary Process of the Presentation of Contextual Information—FIG. 7

FIG. 7 is a flow chart illustrating exemplary actions of the inventions in presenting contextual information to a user. The actions described in connection with FIG. 7 are further referenced through the description of examples provided below in connection with FIG. 8.

As noted, the inventions take advantage of the user's heightened interest in certain subject matter to ask the user whether he or she would like information, and if the answer is yes, then to present the information. An instance of a user's heightened interest in communication devices and/or services may be the user's effort at communication with a communicating partner. For example, a user's effort to send an e-mail to a customer may be a good opportunity to present information to the user on the customer's favorite method of communication, especially if the customer's favorite is not e-mail. If the user chooses to communicate via the customer's preference, then the inventions may present the user with a template or otherwise facilitate the user's communications with the customer. If the user does not have facility to communicate using the customer's preference, then the user may be presented with information on how to gain such facility.

FIG. 7 is a flow chart illustrating exemplary actions of the inventions in seizing the opportunity of a user's effort at communication to present the user with contextual information. After start action 180, in action 182 the user's effort at communication with a communicating partner is detected. For example, if a user is using the com manager, the user may click on or otherwise activate a "new communication" feature of the com manager. The user supplies the identity of the communicating partner.

In action 184, the profile information is checked to determined whether the communicating partner has a profile, and if so, whether the communicating partner has a preference for communicating. A preference may relate to communication devices and/or communication services, and may include details about such preference(s). For example, the communicating partner may prefer to communicate by e-mail, and by e-mail as provided by Service Provider X. If the communicating partner has no preference, the lack of preference may be presented to the user and the user may continue the communication effort without the presentation of additional information.

In action 186, the communicating partner's preference(s) is/are compared to the information in the user's profile. Specifically, the comparison is made to determine whether the user has available the preference(s) of the communicating partner for the user's own use. For example, the user may have an e-mail system provided by Service Provider X. If the user has the preference or can make use of it, then in action 188 the user's communication with the communicating partner is facilitated. Facilitation may include any action taken to help the user with the communication. As an example, if the communicating partner's preference is for e-mail, then an e-mail template may be presented to the user for the user's use. Information in the template regarding the communicating partner, the user, etc. may be supplied so as to further facilitate the user's communication. The process then ends in action 190.

Referring again to action 186 wherein a comparison is carried out to determine whether the user uses the communicating partner's preference(s). If the user does not use one or more of the preference(s), then the inventions take advantage of the situation to ask whether the user would like to see contextual information. In action 192 the user is presented with a trial balloon.

Advantageously, the user is not automatically presented with contextual information when a comparison yields a difference between the user's devices/services and the communicating partner's preferred device(s)/service(s). Instead, so as not to annoy the user with unwanted contextual information, the user is presented with a query in the form of the trial balloon in action 192. The user is asked whether the user would like contextual information on the preferred communication devices and/or services of the communicating partner. In this example, the user may be asked whether he or she would like information on the preferred e-mail system or service provider of the communicating partner.

In action 194 a determination is made as to whether the user responded positively or negatively to the query of action 192. If a positive response is received, then the contextual information is presented to the user in action 196 and the process progresses to action 198. But if a negative response is received to the query of action 192, then the process does not present the contextual information, but proceeds to action 198.

In action 198, a check whether the user desires to continue with the communication may be made in action 198. If the check is negative, then the process ends in action 190. On the other hand, if the check in action 198 is positive, then in action 200 the communication of the user is facilitated.

Figure 8:
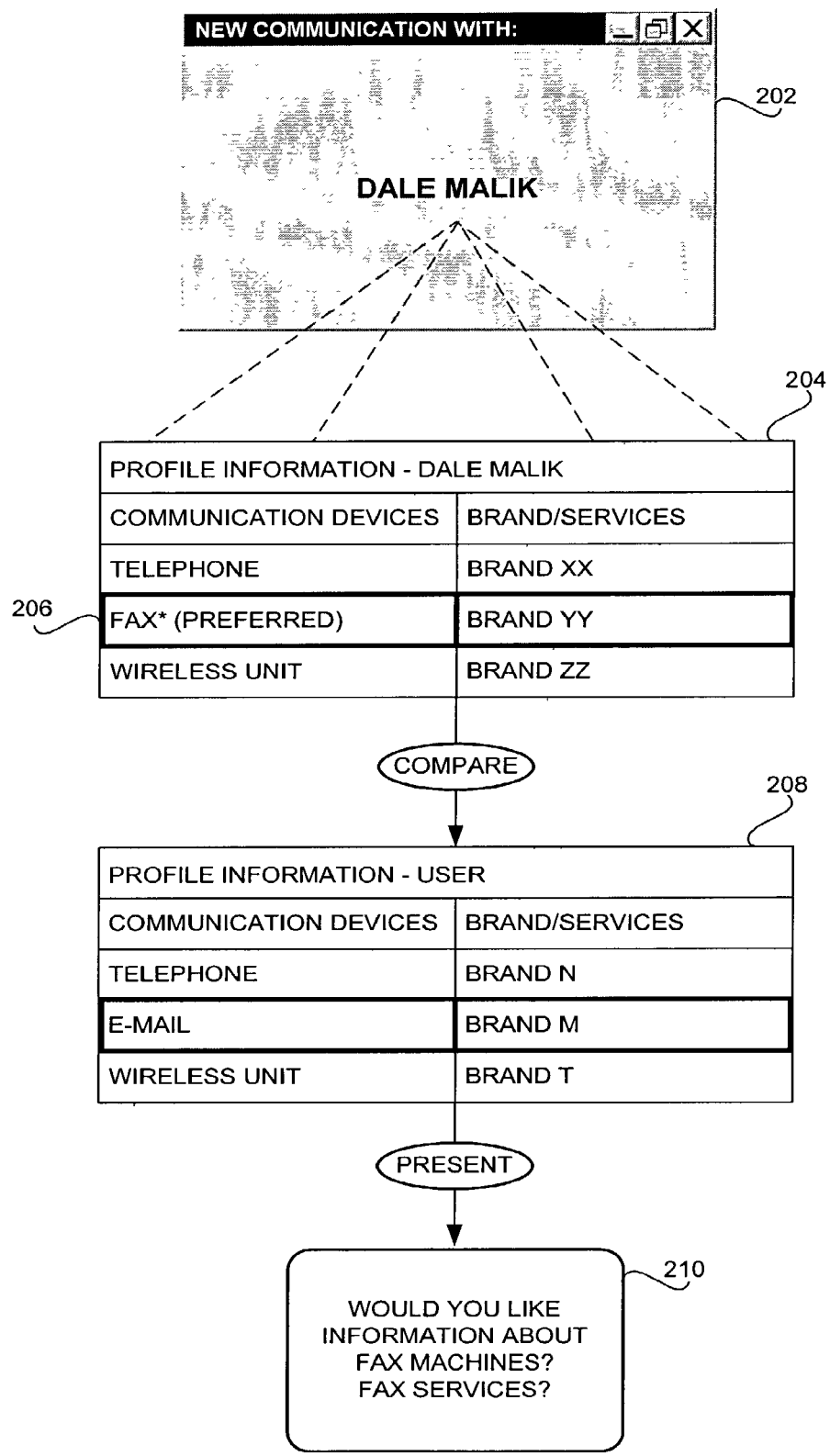
FIG. 8 illustrates an example of the presentation of contextual information.

An Exemplary Presentation of Contextual Information—FIG. 8

The exemplary process of the presentation of contextual information described in connection with FIG. 7 is now further illustrated with an example discussed in connection with FIG. 8.

Assume the user desires to communicate with a communicating partner—Dale Malik and makes an effort at such communication as illustrated by the new communication 202. The user's com manager includes profile information on Dale Malik 204. A preference for fax communication 206 is indicated in Dale Malik's profile information 205. The preference for fax communication 206 is compared to the user's profile information 208. The result of the comparison is that the user does not have a facility for fax communication. Thus, the user is presented with a query 210 as follows: "Would you like information about fax machines? fax service?" If the user responds positively, then contextual information is presented to the user. Advantageously, the inventions allow a fax service provider to present Dale Malik with information on their fax machines or service at a time Dale Malik's interest in faxing is heightened. Thus, Dale Malik is more likely to act on the advertising.

Conclusion

In sum, the inventions allow for the delivery of contextual information such as advertising of communication devices and/or services in such a manner as to gain the attention of a user. The inventions take advantage of instances of a user's heightened interest in the subject matter. For example, the contextual information may be delivered in connection with a user's activation of an entry in profile information or message log relating to the user's communications. Further, the contextual information may be presented in connection with a communication initiated by the user to a communicating partner. Moreover, the contextual information is presented at the direction of the user in response to a query to avoid being annoying or burdensome to the user. Thus, the contextual information is presented to a user at a time when the user's interest in the communication devices and/or services is heightened, and the user is more likely to act on the presented information.

The exemplary embodiments of the inventions described herein were chosen and described in order to explain the principles of the inventions and their practical applications so as to enable others skilled in the art to utilize the inventions including various embodiments and various modifications as are suited to the particular uses contemplated. The examples provided herein in the written description or in the drawings are not intended as limitations of the inventions. Other embodiments will suggest themselves to those skilled in the art. Therefore, the scope of the inventions is to be limited only by the claims below.

The invention claimed is:

1. A method comprising:
   receiving, from a first client device associated with a first user, a communication request for a first user to communicate with a second user associated with a second client device, the communication request received based on the first user selecting a first option within a communication graphical user interface on the first client device associated with the first user;
   accessing, based on receiving the communication request, user profile information for the second user to determine one or more communication types that are available on the second client device associated with the second user;
   comparing, by at least one processor, user profile information for the first user to the user profile information for the second user to determine a communication type from the one or more communication types based on the communication type being available on the first client device associated with the first user;
   automatically providing, within the communication graphical user interface of the first client device and based on the determined communication type, a communication template that utilizes the determined communication type that is available on the first client device and the second client device; and
   facilitating a communication between the first client device and the second client device using the determined communication type.

2. The method of claim 1, further comprising:
   determining from the user profile information for the second user a communication type preference of the second user; and
   wherein determining the communication type from the one or more communication types is further based on the communication type preference of the second user.

3. The method of claim 2, wherein the communication type preference of the second user comprises a communication device or communication service.

4. The method of claim 1, wherein the first option within the communication graphical user interface on the first client device associated with the first user comprises a user identifier of the second user.

5. The method of claim 1, further comprising:
   determining a communication preference for the first user from the user profile information for the first user; and
   providing, based on the determined communication preference for the first user, contextual information to the second client device in association with the communication between the first client device and the second client device using the determined communication type.

6. The method of claim 5, further comprising determining, based on the user profile information for the second user, the communication type associated with the determined communication preference for the first user is not available on the second client device.

7. The method of claim 1, further comprising automatically populating the communication template with contact information for the second user.

8. The method of claim 7, wherein the determined communication type comprises email or instant messaging.

9. The method of claim 1, further comprising:
   detecting a user interaction from the second user corresponding to the communication between the first client device and the second client device using the determined communication type; and providing, to the second client device and in response to the detected user interaction from the second user, contextual information associated with the communication type.

10. The method of claim 9, wherein the contextual information provided to the second client device comprises a communication type preferred by the first user and available on the second client device associated with the second user.

11. The method of claim 10, further comprising providing, within the contextual information, a selectable option to allow the second user to facilitate a communication between the first client device and the second client device using the determined communication type preferred by the first user and available on the second client device.

12. A non-transitory computer readable medium storing instructions that, when executed by at least one processor, cause a computer system to:
receive, from a first client device associated with a first user a communication request for a first user to communicate with and a second user associated with a second client device, the communication request received based on the first user selecting a first option within a communication graphical user interface on the first client device associated with the first user;
access, based on receiving the communication request, user profile information for the second user to determine one or more communication types that are available on the second client device associated with;
compare user profile information for the first user to the user profile information for the second user to determine a communication type from the one or more communication types based on the communication type being available on the first client device associated with the first user;
automatically provide, within the communication graphical user interface of the first client device and based on the determined communication type, a communication template that utilizes the determined communication type that is available on the first client device and the second client device; and
facilitate a communication between the first client device and the second client device using the determined communication type.

13. The non-transitory computer readable medium of claim 12, wherein the instructions, when executed by the at least one processor, cause the computer system to:
determine from the user profile information for the second user a communication type preference of the second user; and
wherein determining the communication type from the one or more communication types is further based on the communication type preference of the second user.

14. The non-transitory computer readable medium of claim 12, further comprising instructions that, when executed by the at least one processor, cause the computer system to:
determine a communication preference for the first user from the user profile information for the first user; and
provide, based on the determined communication preference for the first user, contextual information to the second client device in association with the communication between the first client device and the second client device using the determined communication type.

15. The non-transitory computer readable medium of claim 14, further comprising instructions that, when executed by the at least one processor, cause the computer system to determine, based on the user profile information for the second user, that the communication type associated with the determined communication preference for the first user is not available on the second client device.

16. The non-transitory computer readable medium of claim 12, further comprising instructions that, when executed by the at least one processor, cause the computer system to automatically populate the communication template with contact information for the second user.

17. The non-transitory computer readable medium of claim 12, wherein the first option within the communication graphical user interface on the first client device associated with the first user comprises a user identifier of the second user.

18. The non-transitory computer readable medium of claim 12, wherein the determined communication type comprises email or instant messaging.

19. A system comprising:
at least one processor; and
at least one non-transitory computer readable storage medium storing instructions thereon that, when executed by the at least one processor, cause the system to:
receive, from a first client device associated with a first user a communication request for a first user to communicate with a second user associated with a second client device, the communication request received based on the first user selecting a first option within a communication graphical user interface on the first client device associated with the first user;
access, based on receiving the communication request, user profile information for the second user to determine one or more communication types that are available on the second client device associated with the second user;
compare user profile information for the first user to the user profile information for the second user to determine a communication type from the one or more communication types based on the communication type being available on the first client device associated with the first user;
automatically provide, within the communication graphical user interface of the first client device and based on the determined communication type, a communication template that utilizes the determined communication type that is available on the first client device and the second client device; and
facilitate a communication between the first client device and the second client device using the determined communication type.

20. The system of claim 19, further comprising instructions, that when executed by the at least one processor, cause the system to:
determine from the user profile information for the second user a communication type preference of the second user; and
wherein determining the communication type from the one or more communication types is further based on the communication type preference of the second user.

* * * * *